Aug. 29, 1944.   D. M. LIGHT   2,356,743
FRICTION DEVICE
Filed Feb. 12, 1942   2 Sheets-Sheet 1
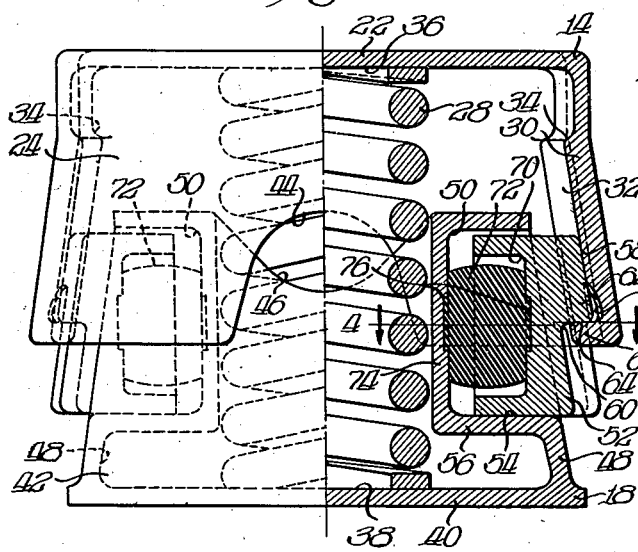
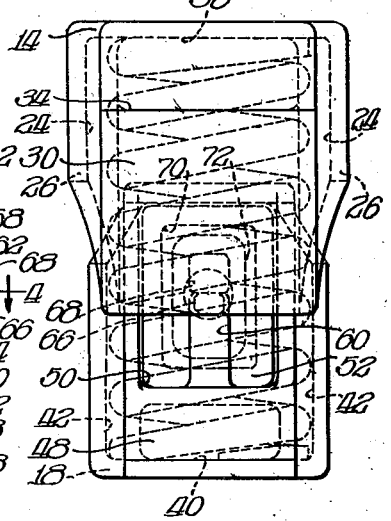
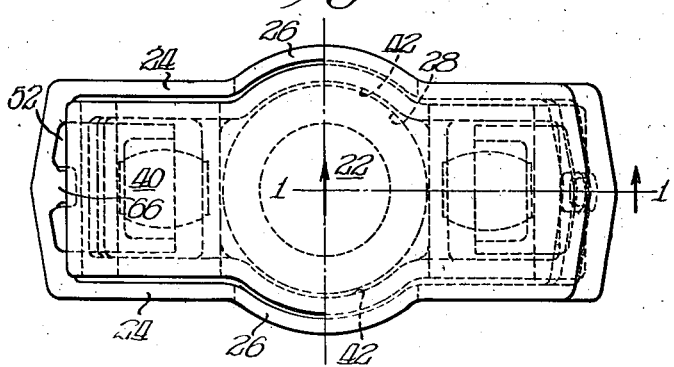
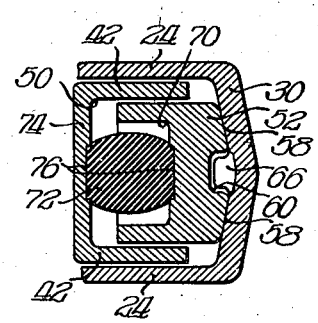
INVENTOR.
David M. Light
BY
ATTORNEY.

Aug. 29, 1944.   D. M. LIGHT   2,356,743
FRICTION DEVICE
Filed Feb. 12, 1942   2 Sheets-Sheet 2

INVENTOR.
David M. Light
BY
ATTORNEY.

Patented Aug. 29, 1944

2,356,743

UNITED STATES PATENT OFFICE 2,356,743

FRICTION DEVICE

David M. Light, Chicago, Ill., assignor to American Steel Foundries, Chicago, Ill., a corporation of New Jersey Application February 12, 1942, Serial No. 430,557

22 Claims. (Cl. 267—9)

My invention relates to a spring group for a railway car truck and more particularly to such a group incorporating a ride control unit or snubber, as such a device is sometimes designated.

My invention constitutes a modification and improvement of my co-pending application, Serial No. 414,751, Spring group, wherein I have illustrated a spring group incorporating a snubber somewhat similar in type.

The general object of my invention is to devise a spring group incorporating a friction device of such form as to facilitate its use in conjunction with springs in railway car trucks.

A specific object of my invention is to devise a spring group of the type described wherein a snubber may be utilized either with or without an inner coil, said snubber comprising spaced followers, one of which is adapted to house friction shoes for engagement with friction surfaces afforded by the other follower.

My invention contemplates a spring group arrangement wherein a friction device may be utilized in parallel with coil springs between spring plates, the top and bottom followers of the friction device being secured to the respective plates, and one of the followers presenting spaced V-shaped friction surfaces for engagement with friction shoes supported by the other follower and resilient means being associated with each friction shoe or set thereof for urging said shoes into engagement with the friction surfaces.

My invention comprehends such an arrangement as that described wherein a pair of friction shoes may be supported at each side of the device and a single resilient means may be utilized to urge both shoes of a single set into frictional engagement with walls of both followers.

In the drawings, Figure 1 is a side elevation, partly in section, of my novel form of friction device, the section being taken substantially in the vertical longitudinal plane bisecting the device as indicated by the line 1—1 of Figure 2.

Figure 2 is a plan view of the friction device, the left half thereof showing a bottom plan and the right half thereof a top plan.

Figure 3 is an end view of the friction device illustrated in Figures 1 and 2.

Figure 4 is a sectional view taken through one end of the friction device substantially in the horizontal plane indicated by the line 4—4 of Figure 1.

Figure 6:
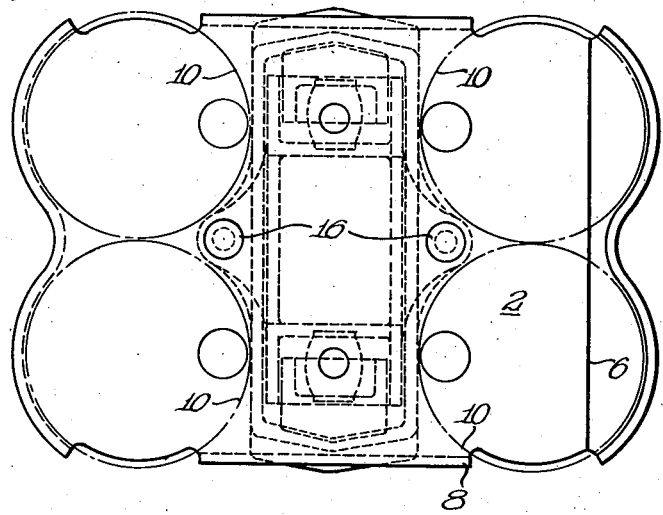
Figures 6 and 7 are assembly views of my novel friction device as utilized with a group of coil springs, Figure 6 being a top plan view thereof and Figure 7 a fragmentary side elevation.
Figure 7:
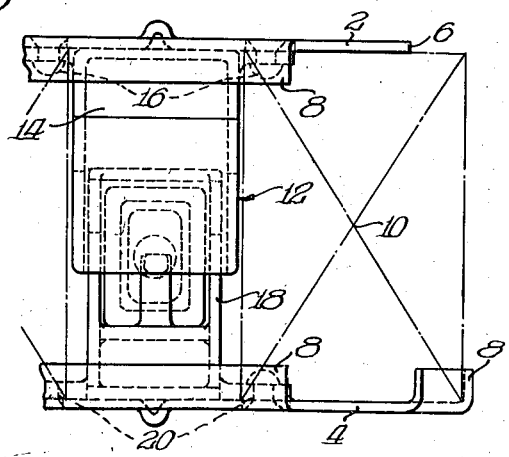

Describing the structure in detail and referring first to the assembly view of Figures 6 and 7, it may be noted that my novel spring group comprises a top spring plate 2 and a bottom spring plate 4 both of well known form, said top plate being cut away at the inboard end as at 6 to afford maximum clearance for a superposed load carrying member, and both of said plates being afforded inturned flanges 8, 8 about the perimeter thereof serving as positioning means for the coil springs diagrammatically indicated at 10, 10. Between the coil springs at opposite ends of the spring group may be positioned my novel form of friction absorbing device generally designated 12, said device comprising a top follower 14 secured as at 16, 16 as by riveting to the top spring plate 2 and the bottom follower 18 similarly secured as at 20, 20 to the bottom spring plate 4.

The detail of the friction absorbing device 12 is shown in Figures 1 to 4 inclusive. At the same time I may use the friction device with the internal coil in conjunction with outside coils if, for any reason, it may be desired for example to add to the load carrying capacity of the group as a whole. As illustrated in these Figures 1 to 4, the friction absorbing device is shown with an internal compression spring whereas said spring is not illustrated in the device when used in combination with a coil spring group as shown in Figures 6 and 7, because the coil springs 10, 10 may act as means of opening the friction device after it has been closed. When used independently, however, the internal compression spring is necessary. As illustrated in Figures 1 to 4 my novel friction device comprises the before-mentioned top follower 14, a box-like structure with a flat top wall 22, side walls 24, 24 having their middle portions bulged outwardly as at 26, 26 to accommodate the enclosed compression spring 28, said top follower also having end walls 30, 30 with V-shaped downwardly diverging friction surfaces 32, 32, the upper ends of said surfaces terminating at shoulders 34, 34 defining relieved areas thereabove. The upper end of the compression spring 28 may seat as at 36 against the top wall 22 of the top follower and the bottom end of said spring may seat as at 38 on the bottom wall 40 of the bottom follower 18, said bottom follower also being a box-like structure with lateral walls 42, 42 outwardly bulged adjacent the midportion thereof in like manner as said top follower to accommodate the centrally positioned compression spring 28. The side walls of the top follower may be cored away centrally thereof as at 44 (Figure 1) and similarly the side walls of the bottom follower may be cored away centrally thereof as at 46, thus reducing the weight and affording a window opening at each side of the device, thus exposing to view for inspection the compression spring 28. The bottom follower 18 may have end walls 48, 48 within which may be formed cup-like cavities or recesses 50, 50 at opposite ends thereof within which may be housed friction shoes 52, 52, each of said friction shoes being seated as at 54 on the horizontal web 56 defining the bottom of said cavity. Each friction shoe 52 may present a V-shaped outwardly directed friction face for engagement with the adjacent friction surface 32, being complementary in form thereto, the character of said engagement being well illustrated at 58, 58 (Figures 1 and 4). Each friction shoe 52 may be formed with a vertical central slot 60 extending from the bottom thereof upwardly for approximately half the length thereof and terminating at the shoulder 62, said shoulder affording a stop as at 64 for the lug 66 centrally formed at the bottom extremity of the adjacent end wall 30. At the base of each lug 66 is formed a relieved portion 68 serving to permit satisfactory engagement between the lug 66 and the shoulder 62 as the friction surfaces at 58 are worn down in use. On the rear face of each friction shoe may be formed a cavity 70 partially housing a pad 72 of resilient material under compression between said shoe and the adjacent vertical web 74 defining in part the before-mentioned pocket 50. Each resilient pad 72 may be positioned at its opposite ends as at 76, 76 with respect to the adjacent friction shoe 52 and wall 74 by convenient interengaging means.

The manner in which this device functions will be clearly apparent to those skilled in the art. It should be noted, however, that the compression spring 28 will not be required when the friction device is utilized in conjunction with the coil springs as illustrated in Figures 6 and 7 where the respective followers of the friction device are secured to the friction plates between which the coil springs are confined.

Figure 5:
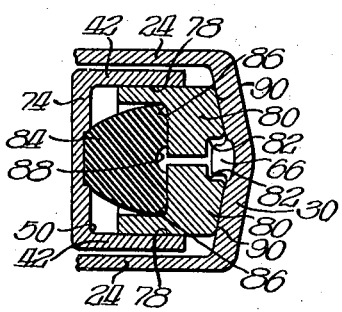
Figure 5 is a further sectional view comparable to that of Figure 4 but illustrating the use of a pair of friction shoes instead of the single friction shoe at each end of the device.

In Figure 5 I have illustrated a modification of my device wherein a pair of friction shoes is used at each end thereof instead of the single shoe. The parts of the structure are otherwise similar to those previously described and similar reference characters are applied thereto, the side walls of the top follower being illustrated at 24, 24, those of the bottom follower at 42, 42, the transverse web 74 defining in part the pocket 50 as already described, said pocket 50 affording slidable seating, top and bottom, as at 78, 78 for the respective friction shoes 80, 80, said friction shoes being formed left and right approximately as halves of the friction shoe 52 illustrated in the previous embodiment. The friction shoes 80, 80 may be formed with adjacent vertical slots 82, 82 accommodating the lug 66 already described. Compressed in three ways between the friction shoes 80, 80 and the spaced wall 74 may be the somewhat cone-shaped rubber pad 84, the top of said cone seating against the wall 74 and being positioned with respect thereto, and the opposite sides of the base thereof abutting respectively the friction shoes 80, 80 as at 86, 86. The resilient pad 84 is afforded a central vertical slot 88 affording clearance from the adjacent edges of the friction shoes and preventing interference between said rubber pad and said wedges. In this form of my device it should be noted that the rubber pad 84 is compressed between the friction shoes, tending to urge them in opposite directions against the spaced lateral walls 42, 42, and also said pad is compressed between the friction shoes and the wall 74, thus being effective to urge the friction shoes against the end wall 30 of the top follower for frictional engagement therewith as at 90, 90. Thus it is clear that the single resilient member 84 is operative to urge both shoes of one pair into engagement against a wall of each follower so that each shoe has frictional engagement with both followers.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a spring group, top and bottom spring plates, a coil spring and a snubber confined between said plates with opposite followers of said snubber secured respectively to said plates, resilient means compressed between said followers, friction means at each end of said snubber comprising a friction wall on one follower, a friction shoe cavity on the other follower supporting a pair of friction shoes in engagement with said wall, a resilient member compressed within said cavity between a wall thereof and said shoes and operative to urge said shoes apart into engagement with opposite walls of said cavity and also operable to urge each of said shoes into engagement with said friction walls, and shoulders on said shoes engaging a lug on said friction wall as interlocking means for said member.

2. In a spring group for a railway car truck, top and bottom spring plates, coil springs confined therebetween at opposite ends thereof and a friction device interposed between said coils with top and bottom followers fixed respectively to said plates, one of said followers having at opposite ends thereof opposed V-shaped tapering friction surfaces and the other of said followers carrying friction shoes for engagement with said surfaces respectively and resilient means associated with each of said shoes and operative to urge said shoes into engagement with the adjacent surfaces respectively, and a coil spring interposed between said followers intermediate said shoes.

3. In a spring group, top and bottom plates, coil springs confined between said plates and snubbing means interposed between said springs with top and bottom followers secured respectively to said plates, said snubbing means comprising a coil spring interposed between said followers and friction means at opposite sides of said coil spring, each of said friction means comprising a tapered wall on one of said followers, means on the other of said followers supporting a friction shoe in engagement with said wall, and resilient means associated with each shoe.

4. In a spring group, top and bottom spring plates, a coil spring and a snubber confined between said plates with opposite followers of said snubber secured respectively to said plates, resilient means compressed between said followers, friction means at each side of said resilient means comprising a friction wall on one follower, a friction shoe cavity on the other follower supporting a pair of friction shoes in engagement with said wall, and a resilient member compressed within said cavity between a wall thereof and said shoes and operative to urge said shoes apart into engagement with opposite walls of said cavity and also operable to urge each of said shoes into engagement with said friction walls.

5. In a friction device, top and bottom followers, one of said followers presenting at opposite ends of said device V-shaped diverging friction walls, the other of said followers resiliently supporting pairs of friction shoes for engagement with said walls respectively, the resilient support at each end of said device comprising a single resilient pad affording a direct force path between the shoes of the adjacent pair and between each shoe and a wall of the supporting follower, each of said resilient pads being operative to urge each shoe of the adjacent pair into frictional engagement with a wall of each follower, said last-mentioned walls diverging from each other at an angle of not less than ninety degrees, and a coil spring compressed between said followers in alignment with said pads.

6. In a spring group for a railway car truck, spaced spring plates, coil springs between said plates adjacent opposite ends thereof, and a ride control device interposed between said coils with top and bottom followers secured respectively to said plates, said device having friction means at opposite ends thereof and a coil spring compressed between said followers intermediate said friction means, each of said friction means comprising a tapered wall on one of said followers, a friction shoe supported from the other of said followers in engagement with said wall, resilient means operative to urge each shoe into engagement with the adjacent wall, and interengaging means on each shoe and the adjacent wall operative to limit the travel of said followers.

7. In a spring group for a railway car truck, spaced spring plates, coil springs between said plates adjacent opposite ends thereof, and a ride control device interposed between said coils with top and bottom followers secured respectively to said plates, said device having a coil spring compressed between said followers and friction means at opposite ends thereof adjacent opposite edges of said plates, each of said friction means comprising a V-shaped tapering friction wall on one of said followers, means on the other of said followers resiliently supporting a friction shoe in engagement with said wall, and a slot in each shoe receiving a lug on the adjacent wall as interlocking means for said device.

8. In a friction device, top and bottom followers, a coil spring compressed therebetween, one of said followers presenting at opposite ends of said device V-shaped diverging friction walls, the other of said followers resiliently supporting pairs of friction shoes for engagement with said walls respectively, the resilient support at each end of said device comprising a single resilient pad affording a direct force path between the shoes of the adjacent pair and between each shoe and a wall of the supporting follower, each of said resilient pads being operative to urge each shoe of the adjacent pair into frictional engagement with a wall of each follower.

9. In a spring group, top and bottom spring plates, a coil spring and a snubber confined between said plates with opposite followers of said snubber secured respectively to said plates, resilient means compressed between said followers, friction means at each end of said snubber comprising a friction wall on one follower, a friction shoe cavity on the other follower supporting a pair of friction shoes in engagement with said wall, and a resilient pad compressed within cavity between said shoes and a wall of said cavity, said pad being operable to urge each of said friction shoes into engagement with said friction wall and into engagement with an adjacent wall.

10. In a spring group for a railway car truck, top and bottom spring plates, coil springs confined therebetween at opposite ends thereof, and a friction device interposed between said coils with top and bottom followers secured respectively to said plates, a coil spring interposed between said follows, one of said followers having walls presenting internal V-shaped tapering friction surfaces, and the other of said followers supporting pairs of friction shoes for engagement with said surfaces respectively, and resilient means associated with each pair of said shoes and operative to urge said shoes into engagement with the adjacent surfaces respectively.

11. In a spring group, top and bottom plates, coil springs confined between said plates at opposite ends thereof, and snubbing means interposed between said springs with top and bottom followers secured respectively to said plates, said snubbing means having friction means at opposite ends thereof each comprising a tapered wall on one of said followers, means on the other of said followers supporting a friction shoe in engagement with said wall, resilient means associated with each shoe for urging said shoe into engagement with the adjacent wall, interengaging positioning means on each shoe and the adjacent wall, and a coil spring compressed between said top and bottom followers intermediate said friction means.

12. In a spring group, top and bottom spring plates, a coil spring and a snubber confined between said plates with opposite followers of said snubber secured respectively to said plates, resilient means compressed between said followers, and friction means at each end of said snubber comprising a friction wall on one follower, a friction shoe cavity on the other follower supporting a pair of friction shoes in engagement with said wall, and a resilient pad under compression between said shoes within said cavity operative to urge each of said shoes into engagement with a wall of said cavity and with said friction wall.

13. In a spring group, top and bottom plates, coil springs between said plates and snubbing means interposed between said springs with top and bottom followers fixed respectively to said plates, one of said followers presenting internal oppositely directed tapered walls at opposite ends thereof, the other of said followers supporting pairs of friction shoes for engagement with said walls respectively, a coil spring compressed between said followers intermediate said friction shoe supports, and resilient means associated with each pair of friction shoes and operative to urge the shoes of each pair apart from each other and into engagement with the adjacent wall.

14. In a spring group for a railway car truck, spaced spring plates, coil springs between said plates adjacent opposite ends thereof, and a ride control device interposed between said coils with top and bottom followers secured respectively to said plates, said device having friction means at opposite ends thereof, resilient means compressed between said followers intermediate said friction means, each of said friction means comprising a tapered wall on one of said followers, a friction shoe supported from the other of said followers in engagement with said wall, and independent resilient means operative to urge each shoe into engagement with the adjacent wall.

15. In a friction device, top and bottom followers, a coil spring compressed therebetween, one of said followers presenting at opposite ends of said device V-shaped diverging friction walls, the other of said followers resiliently supporting pairs of friction shoes for engagement with said walls respectively, the resilient support at each end of said device comprising a single resilient member compressed between the shoes of the adjacent pair and between each shoe and an adjacent wall of the supporting follower, said coil spring being interposed between said resilient members in alignment therewith.

16. In a spring group, top and bottom plates, a coil spring and a friction device confined therebetween, said friction device comprising a top follower with V-shaped tapering friction walls, a bottom follower housing friction shoes for engagement with said walls, resilient means compressed between each shoe and said bottom follower urging said shoe into engagement with the adjacent friction wall, and slots in said friction shoes slidably receiving lugs on said walls as interlocking means for said device.

17. In a friction device, top and bottom followers, resilient means compressed therebetween, one of said followers presenting at opposite ends of said device diverging friction walls, the other of said followers independently and resiliently supporting friction shoes for engagement with said walls, said resilient means being positioned intermediate said friction shoe supports.

18. In a friction device, a top follower presenting at opposite ends thereof V-shaped internal tapering friction surfaces, a bottom follower housing pairs of friction shoes in engagement with said surfaces respectively, a coil spring compressed between said followers, and resilient means associated with each pair of friction shoes and operative to urge each shoe into frictional engagement with both of said followers.

19. In a friction device, a top follower presenting at opposite ends thereof V-shaped internal tapering friction surfaces, a bottom follower housing pairs of friction shoes in engagement with said surfaces respectively, a coil spring compressed between said followers, and resilient means associated with each pair of friction shoes and operative to urge said shoes in opposite directions and into engagement with the adjacent friction surface.

20. In a friction device, a top follower presenting at opposite ends thereof V-shaped internal tapering friction surfaces, a bottom follower housing pairs of friction shoes in engagement with said surfaces respectively, a coil spring compressed between said followers, and resilient means associated with each pair of friction shoes and operative to urge each of said shoes into frictional engagement with walls of both of said followers.

21. In a friction device, a top follower presenting at opposite ends thereof V-shaped internal tapering friction surfaces, a bottom follower housing pairs of friction shoes in engagement with said surfaces respectively, a coil spring compressed between said followers, and resilient means associated with each pair of friction shoes and operative to urge each of said shoes into frictional engagement with walls of both of said followers, and a lug at each end of said top follower engaging both shoes of the adjacent pair to limit the expansion of said device.

22. In a friction device, a top follower presenting at opposite ends thereof V-shaped internal tapering friction surfaces, a bottom follower housing pairs of friction shoes in engagement with said surfaces respectively, a coil spring compressed between said followers, and resilient means associated with each pair of friction shoes and operative to urge said shoes in opposite directions and into engagement with the adjacent friction surface, and interlocking means on said top follower and said shoes.

DAVID M. LIGHT.